(12) United States Patent
Brooks

(10) Patent No.: US 8,211,223 B2
(45) Date of Patent: Jul. 3, 2012

(54) PULP BASED CLAY AND PREPARATION OF PULP BASED CLAY

(76) Inventor: Jonathan Brooks, Walnut, CA (US)

( * ) Notice: Subject to any disclaimer, the term of this patent is extended or adjusted under 35 U.S.C. 154(b) by 562 days.

(21) Appl. No.: 12/354,400

(22) Filed: Jan. 15, 2009

(65) Prior Publication Data

US 2010/0179052 A1    Jul. 15, 2010

(51) Int. Cl.
*C08L 1/02* (2006.01)
*B29C 47/76* (2006.01)

(52) U.S. Cl. ..................... 106/204.3; 264/102

(58) Field of Classification Search ............ 106/164.51, 106/204.3; 264/102
See application file for complete search history.

(56) References Cited

U.S. PATENT DOCUMENTS

| | | | | |
|---|---|---|---|---|
| 1,501,975 A | * | 7/1924 | Strehlenert | 106/123.12 |
| 1,832,807 A | * | 11/1931 | Ellis | 501/140 |
| 1,926,543 A | * | 9/1933 | Keeth | 106/164.51 |
| 5,466,288 A | * | 11/1995 | Derr | 106/486 |
| 5,726,111 A | | 3/1998 | Gault | |
| 2010/0090377 A1 | * | 4/2010 | Im | 264/638 |

OTHER PUBLICATIONS

"Brick." How Products are Made. Ed. Stacey L. Blachford. Gale Cengage, (2002),enotes.*
"Brick", How Products are made, Ed. Stacey L. Blanchford, Gale Cengage, (2007) [from the Internet Archive].*

* cited by examiner

*Primary Examiner* — David M Brunsman
(74) *Attorney, Agent, or Firm* — Christopher C. Dremann, P.C.

(57) ABSTRACT

A clay-pulp mixture is prepared by blending a predetermined ratio of clay and wood pulp (specifically, fiber derived from virgin alpha cellulose) in dry form, moistening the mixture homogeneously by adding water and continuing to blend until a malleable consistency is achieved. Air is extracted from the moist mixture, and solid blocks formed for storage and delivery to end-users.

18 Claims, No Drawings

PULP BASED CLAY AND PREPARATION OF PULP BASED CLAY

BACKGROUND

Industrial clay is used for many applications including, but not limited to, sculpting, mold preparation, and many more. Pure clay is, however, fragile when dry, dense, and heavy causing structures made from clay to warp and/or crack, thereby, limiting its use. The problems caused by clay cracking or warping during the drying process are sometimes mitigated by controlled drying such as covering clay structures to reduce moisture slowly, designing structures for effects of shrinkage, actively moistening surfaces of the structure during the drying process, and similar operations. These approaches all add to the complexity and cost of using clay making it more difficult for users.

Mixtures of clay with lighter material to overcome these shortcomings have been tried including clay/pulp mixes. Additives such as sand, grog, nylon, fiberglass, polypropylene, and the like, are used to strengthen clay before or after drying (or baking). While each of these materials may add a different property to clay, they bring along their own disadvantages from increased complexity of mixing to use restrictions.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to a clay-pulp mixture and preparation of such a mixture. Clay is prepared in dry form such as by mixing different clay types in dry powder form. Wood pulp (as defined hereinafter) in dry form is added and the mixture mixed and blended until homogeneity is achieved. Water and additives may be added as desired to achieve different level of malleability.

These and other features and advantages will be apparent from a reading of the following detailed description. It is to be understood that both the foregoing general description and the following detailed description are explanatory only and are not restrictive of aspects as claimed.

DETAILED DESCRIPTION

As briefly described above, wood or paper pulp may be mixed with clay through dry blending to obtain moist clay mainly used for modeling purposes. In the following detailed description, references are made to specific example aspects. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

According to some embodiments, dry clay in powdered form is prepared for mixing with wood pulp. Dry clay may comprise a single clay type or a mixture of different clays. In the latter case, the clay powders may be blended into a homogeneous mixture first. The clay is then mixed with wood pulp (specifically, fiber derived from virgin alpha cellulose) in dry form and blended until a homogeneous mixture is achieved. As used herein, the term "virgin alpha cellulose" is intended to mean "highly refined, insoluble cellulose from which sugars, pectin, and other soluble materials have been removed." While fiber derived from virgin alpha cellulose (virgin alpha cellulose fiber) is used in a mixture according to preferred embodiments of the invention, other embodiments may be implemented using other types of pulp such as pulp derived from various types of paper.

Once dry clay and pulp have been blended to homogenous standards, water in varying amounts based on formula, is induced. Clay and pulp mixture may then be further blended to malleable consistency. Additional biocide preservative products may be added to increase shelf life of product. Clay and pulp mixture is extruded into blocks of predefined dimensions (e.g. 6 inch×6 inch, 25-pound blocks) and measured with a pentrometer to meet malleability standards. The end product in block form may then be bagged, boxed, stocked, or shipped to end-users.

Clay mixture may include a number of additional materials for various purposes such as fireclay, ball clay, kaolin, talc, red clay, ceramic grog, feldspar, silica, silica sand, or grog. Raw materials, which make up clay, are from earthy sedimentary material (clay) comprising primarily of hydrated silicates of alumina grains, smaller than 0.002 millimeters in diameter. Raw materials may be classified into clay groups based on the igneous feldspatic "mother" rock (geological source) they originate from. Primary clay, closest to its source, is kaolin or china. Secondary clays, further from the source, are fire clays and ball clays. These different classifications of clays may be combined (based on formula or recipe), mixed and blended together with water to create malleable material specific to the end user's needs (e.g. pottery, bricks, tiles, etc.). A majority of mixed clays also include sand, grog, feldspar, silica, talc, or high iron red clay. The appropriate clay mixture ratio may be selected depending upon the desired texture, color, type of use, etc.

According to a preferred embodiment, water and preservatives are added to the homogeneous mixture of clay and pulp after those are mixed in dry form based on a desired firmness of the end product. While a ratio of pulp to clay according to the preferred embodiment may be in the range 3% to 10% by weight, mixtures based on other ratios are also acceptable.

During the mixing process, dry raw materials are dispersed and blended in an industrial mixer for approximately five minutes. Pulp is then dispersed in to the dry mix and is further paddle-blended for an additional period (e.g. 5 minutes). This allows the pulp to disperse throughout the dry blend of clays and avoid clumps. Dryness is typically achieved through force drying and is commonly defined as the material containing 5% or less moisture.

Homogeneity in the moist mixture is achieved by blending the clay after water is added for a predefined period (e.g. ten minutes). Homogeneity may be determined by lack of variation in color, chunks, or lumps of unmixed materials and moisture inconsistencies. When properly mixed, the complete batch of finished moist clay product is visually identical and of the same water content. A moist pulp-clay mixture according to a preferred embodiment may contain 17% to 23% water with ±0.3% tolerance as determined at the end-product stage. However, embodiments may be implemented with any moisture content based on desired firmness and consistency.

After the clay is fully mixed and moisturized (homogenous), it may be fed into a de-airing extruder that pushes the clay through a shredder and into a vacuum chamber, where the clay is subjected to a vacuum to extract the air out of it. The clay may then be re-compressed and extruded out of a die of predefined dimensions to form desired blocks. Without the de-airing process the clay may not be usable for pottery making without further processing. The clay blocks may be wrapped in moisture controlling material such as plastic for longer shelf life.

While specific clay components, mixture ratios, and other measures have been described above, these are for illustration purposes only and do not constitute a limitation on embodiments. Many other materials, mixture ratios, and processes may be implemented using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method of preparing a pulp based clay, the method comprising:
providing a dry form mixture of clay and virgin alpha cellulose; blending the dry form mixture of clay and virgin alpha cellulose; adding water to the dry form mixture of clay and virgin alpha cellulose as the mixture is blended to produce a malleable moist form mixture of clay and virgin alpha cellulose; and forming blocks of the pulp based clay from the moist form mixture of clay and virgin alpha cellulose.

2. The method of claim 1, wherein the dry form mixture of clay and virgin alpha cellulose further includes cellulose from paper.

3. The method of claim 1, wherein the clay includes a primary clay component and a secondary clay component.

4. The method of claim 3, wherein the primary clay component further includes at least one additional material selected from the group consisting of: kaolin, red clay, and feldspar.

5. The method of claim 3, wherein the secondary clay component further includes at least one additional material selected from the group consisting of: fireclay, ball clay, talc, silica, silica sand, and grog.

6. The method of claim 3, wherein providing the dry form mixture of clay and virgin alpha cellulose comprises: dispersing and blending the primary clay component and the secondary clay component; and wherein blending the dry form mixture of clay and virgin alpha cellulose comprises: dispersing and paddle-blending the virgin alpha cellulose with the clay.

7. The method of claim 6, wherein the dry form mixture of clay and virgin alpha cellulose contains less than about 5% moisture.

8. The method of claim 7, wherein a moisture content of the moist form mixture of clay and virgin alpha cellulose is between about 17% and about 23%.

9. The method of claim 1, wherein a ratio of virgin alpha cellulose to clay in the dry form mixture of clay and virgin alpha cellulose is between about 3% and about 10% by weight.

10. The method of claim 1, further comprising: feeding the moist form mixture of clay and virgin alpha cellulose through a de-airing extruder to release captured air.

11. The method of claim 10, wherein the de-airing extruder is configured to subject the moist form mixture of clay and virgin alpha cellulose to a vacuum.

12. The method of claim 11, further comprising: compressing the moist form mixture of clay and virgin alpha cellulose following feeding the moist form mixture of clay and virgin alpha cellulose through the de-airing extruder and prior to forming blocks of the pulp based clay.

13. The method of claim 1, wherein the moist form mixture of clay and virgin alpha cellulose further comprises a biocide preservative additive.

14. A pulp based clay comprising: virgin alpha cellulose; and clay including at least one clay selected from the group consisting of: kaolin, red clay, fireclay and ball clay and further including at least one additional material selected from the group consisting of: feldspar, talc, silica, silica sand and grog; wherein the virgin alpha cellulose and the clay are mixed together into a dry form mixture, the dry form mixture is blended while being combined with water to produce a moist form mixture, and the moist form mixture is formed into blocks of the pulp based clay.

15. The pulp based clay of claim 14, wherein the moist form mixture includes moisture in a range of about 17% to 23%.

16. The pulp based clay of claim 15, wherein the blocks are packaged in moisture controlling packaging material to preserve the moisture.

17. The pulp based clay of claim 14, wherein a ratio of the virgin alpha cellulose to the clay in the dry form mixture is between about 3% and about 10% by weight.

18. The pulp based clay of claim 14, wherein the moist form mixture further comprises a biocide preservative additive.

* * * * *